(12) United States Patent
Takami et al.

(10) Patent No.: US 11,454,205 B2
(45) Date of Patent: Sep. 27, 2022

(54) WAVE POWER UTILIZATION DEVICE AND CONTROL METHOD THEREOF

(71) Applicant: Panasonic Intellectual Property Management Co., Ltd., Osaka (JP)

(72) Inventors: Fuminori Takami, Osaka (JP); Terutsugu Segawa, Osaka (JP); Isamu Aokura, Ibaraki (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/338,734

(22) Filed: Jun. 4, 2021

(65) Prior Publication Data

US 2022/0003200 A1 Jan. 6, 2022

(30) Foreign Application Priority Data

Jul. 1, 2020 (JP) .............................. JP2020-114239

(51) Int. Cl.
*F03B 13/00* (2006.01)
*F03B 13/14* (2006.01)

(52) U.S. Cl.
CPC ................................ *F03B 13/142* (2013.01)

(58) Field of Classification Search
CPC ........ F03B 13/142; F03B 13/24; F03B 13/14; F05B 2260/422; F05B 2270/202; F05B 2270/342; Y02E 10/30
See application file for complete search history.

(56) References Cited

U.S. PATENT DOCUMENTS

| 1,423,291 | A | * | 7/1922 | Aikman | .................... E03B 5/00 |
| | | | | | 417/139 |
| 4,118,637 | A | * | 10/1978 | Tackett | ..................... F03D 9/28 |
| | | | | | 416/DIG. 4 |
| 4,281,257 | A | * | 7/1981 | Testa | ....................... F03B 13/24 |
| | | | | | 417/343 |
| 2013/0020098 | A1* | | 1/2013 | Bui | ...................... A62C 3/0214 |
| | | | | | 169/45 |

FOREIGN PATENT DOCUMENTS

| JP | 59-160043 | 9/1984 |
| JP | 60-104779 | 6/1985 |
| JP | 61-014483 | 1/1986 |
| JP | 2000-218344 | 8/2000 |
| JP | 2014-020360 | 2/2014 |

* cited by examiner

*Primary Examiner* — Julio C. Gonzalez
(74) *Attorney, Agent, or Firm* — Wenderoth, Lind & Ponack L.L.P.

(57) ABSTRACT

By receiving a leading wave in a state where a wave receiving box is sunk on the coast, a pressure return pipe and a pressure return on-off valve are controlled, and a water surface in an air compression pipe is set to a reference water surface lower than an air throttle, even when there are tide level fluctuations and wave size variations in one wave receiving box, energy of the wave is converted into compressed air without loss, is stored in a compressed air storage tank, and can be used for power generation or the like.

6 Claims, 6 Drawing Sheets

WAVE POWER UTILIZATION DEVICE AND CONTROL METHOD THEREOF

BACKGROUND

1. Technical Field

The present invention relates to a wave power utilization device and a control method thereof for generating and storing compressed air from the energy of waves in order to widely utilize the energy of the rushing waves.

2. Description of the Related Art

World energy consumption continues to increase year by year. Global warming has become a problem due to the increase in $CO_2$ emissions caused by the increase in use of fossil fuels such as oil, coal, and natural gas. Meanwhile, there is a concern that these fossil fuels will be in short supply due to depletion. Under these circumstances, the use of renewable energy is being actively promoted in the world. Among the renewable energies, the natural energies obtained from natural phenomena include sunlight and heat, wind power, tidal power, wave power, and geothermal power, and are expected as clean energy resources without a concern about depletion.

Among natural energies, while power generation amount of solar power generation and wind power generation is greatly affected by external factors, wave power generation is relatively stable and area efficiency is to be several to several tens of times. Japan, which is an island country, has high potential for the utilization of ocean energy.

However, there are problems related to installation costs for installation in the ocean, corrosion due to constant contact with seawater, maintenance costs associated with ensuring long-term reliability such as regular maintenance of foreign matter such as shellfish, barnacles, and dust, and safety against abnormal weather such as typhoons.

As a system that generates electricity by using the power of the rushing waves in the related art, there is a system that generates electricity by generating compressed air using a wave introduction box and turning a blade wind turbine using the compressed air (for example, refer to Japanese Patent Unexamined Publication No. 2014-20360).

FIG. 7 is a view illustrating a power generation method that utilizes wave power in the related art described in Japanese Patent Unexamined Publication No. 2014-20360.

In FIG. 7, (a) of FIG. 7 illustrates a wave introduction box, and (b) of FIG. 7 illustrates an example in which the wave introduction box is installed in a coastal structure and the entire system in which a plurality of wave introduction boxes are installed. Wave introduction box 101 has a funnel-shaped structure that sharply narrows from wave introduction box inlet 102 toward the rear part. Furthermore, compressed air ventilation pipe 103 including a nozzle-shaped compressed air outlet at the tip end connected upward at the rear end of wave introduction box 101, is provided. Blade wind turbine 104 is disposed at the tip of the compressed air outlet of compressed air ventilation pipe 103, and generator 105 that rotates with the rotational force of blade wind turbine 104 to generate electricity is connected to blade wind turbine 104.

The air is pushed into the rear part by the wave that rushes to wave introduction box inlet 102, the pushed-in compressed air passes through compressed air ventilation pipe 103, the compressed air ejected from the compressed air outlet of compressed air ventilation pipe 103 is blown onto blade wind turbine 104 to continue to rotate blade wind turbine 104 in one direction, and accordingly, the generator 105 generates electricity.

As in the installation example of (b) of FIG. 7, by disposing a plurality of wave introduction boxes 101 in the height direction or by providing a vertical movement mechanism, or by disposing a plurality of wave introduction boxes 101 in parallel in the width direction according to the height of the tide level, it is possible to receive waves at all times and continuously rotate the plurality of blade wind turbines 104, and thus, stable power generation is possible at all times.

SUMMARY

According to an aspect of the present invention, there is provided a control method of controlling a wave power utilization device including a wave receiving box which has a wave receiving box inlet part that is open toward the sea and receives rushing of a wave, has a space filled with seawater from the wave receiving box inlet part toward a downstream side, and is sunk on the coast, a hollow air compression pipe in which a lower pipe is set to have a wider flow path cross-sectional area than that of an upper pipe, an air throttle that connects the lower pipe and the upper pipe to each other in a tapered shape is provided, the lower pipe is connected upright to an upper part on the downstream side of the wave receiving box, and air is compressed to form compressed air, a pressure measuring device which measures a pressure of the air compression pipe, an air suction port connected to an upper end of the air compression pipe and provided with a first check valve to suction the air from an outside of the air compression pipe, an air discharge pipe connected to the upper end of the air compression pipe and provided with a second check valve to discharge the compressed air from an inside of the air compression pipe, a compressed air storage tank installed downstream of the air discharge pipe and filled with the compressed air discharged from the air compression pipe, a pressure return pipe connecting the compressed air storage tank and the air compression pipe to each other, a pressure return on-off valve which is provided in the middle of the pressure return pipe and opens and closes a flow path of the pressure return pipe, and a compressed air utilizer which is provided in a flow path on a downstream side of the compressed air storage tank and utilizes the compressed air, the method including: suctioning the air into the air compression pipe from the air suction port during a backwash; opening the pressure return on-off valve after confirming suction of the air with the pressure measuring device; returning a part of the compressed air filled in the compressed air storage tank to the inside of the air compression pipe through the pressure return pipe; and lowering a water surface in the air compression pipe to be lower than the air throttle.

According to another aspect of the present invention, there is provided a wave power utilization device including: a wave receiving box which has a wave receiving box inlet part that is open toward the sea and receives rushing of a wave, has a space filled with seawater from the wave receiving box inlet part toward a downstream side, and is sunk on the coast; a hollow air compression pipe in which a lower pipe is set to have a wider flow path cross-sectional area than that of an upper pipe, an air throttle that connects the lower pipe and the upper pipe to each other in a tapered shape is provided, the lower pipe is connected upright to an upper part on the downstream side of the wave receiving box, and air is compressed to form compressed air; a pressure measuring device which measures a pressure of the air compression pipe; an air suction port connected to an upper end of the air compression pipe and provided with a first check valve to suction the air from an outside of the air compression pipe; an air discharge pipe connected to the upper end of the air compression pipe and provided with a second check valve to discharge the compressed air from an inside of the air compression pipe; a compressed air storage tank installed downstream of the air discharge pipe and filled with the compressed air discharged from the air compression pipe; a pressure return pipe connecting the compressed air storage tank and the air compression pipe to each other; a pressure return on-off valve which is provided in the middle of the pressure return pipe and opens and closes a flow path of the pressure return pipe; a compressed air utilizer which is provided in a flow path on a downstream side of the compressed air storage tank and utilizes the compressed air; a water level detecting device which is installed in the air compression pipe and detects a water level in the air compression pipe; and a control device that controls the pressure return on-off valve based on the water level in the air compression pipe detected by the water level detecting device.

According to still another aspect of the present invention, there is provided a wave power utilization device including: a wave height measuring device for measuring a wave height; and a control device that calculates a pressure inside the air compression pipe for lowering a water level in the air compression pipe based on the wave height measured by the wave height measuring device to be lower than the air throttle, and controls the pressure return on-off valve such that a pressure value measured by the pressure measuring device installed in the air compression pipe becomes the same as the pressure inside the air compression pipe, instead of the water level detecting device and the control device described above.

DETAILED DESCRIPTIONS

However, in the configuration of the related art, since wave introduction box 101 needs to be installed at a position where the wave entrains air, an opening of wave introduction box inlet 102 needs to come out from the sea surface. With respect to the fluctuating tide level, a plurality of wave introduction boxes 101 are installed in parallel in the height direction or a vertical movement mechanism is used. The former has a problem that there is a wave introduction box that does not contribute to power generation and is not efficient, and the latter has a problem that the device becomes complicated and long-term reliability deteriorates. By installing a plurality of wave introduction boxes 101 in parallel in the horizontal direction and sending the compressed air to one blade wind turbine 104, even when the wave size or period variations occur, it is possible to continue to send the compressed air to blade wind turbine 104 from wave introduction box 101 that receives the wave. Thus, the power generation efficiency is poor with respect to the installation area.

The present invention solves the above-described problems of the related art, and an object thereof is to provide a wave power utilization device and a control method thereof that can efficiently store and utilize the wave power as compressed air with a simple configuration without being affected by tide level fluctuations and wave size variations.

Hereinafter, embodiments of the present invention will be described with reference to the drawings.

Embodiment 1

Figure 1:
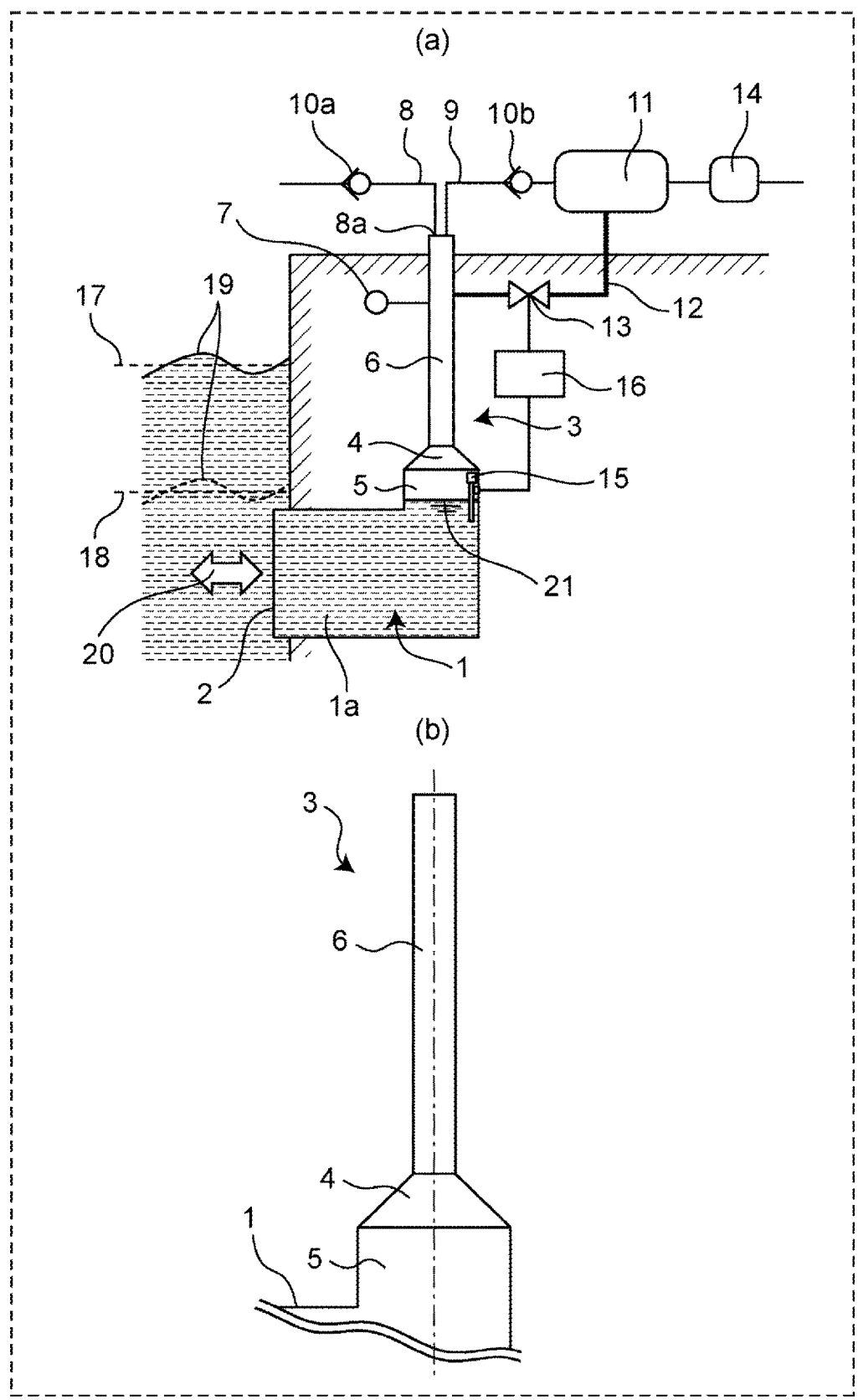
FIG. 1 is a view illustrating a configuration of a wave power utilization device according to Embodiment 1 of the present invention.

FIG. 1 is a view illustrating a configuration of a wave power utilization device according to Embodiment 1 of the present invention. (a) of FIG. 1 is an overall view of the wave power utilization device, and (b) of FIG. 1 is an enlarged view of air compression pipe 3. The wave power utilization device includes wave receiving box 1, air compression pipe 3, pressure measuring device 7, air suction port 8a, air discharge pipe 9, compressed air storage tank 11, pressure return pipe 12, pressure return on-off valve 13, and compressed air utilizer 14.

In FIGS. 1(a) and 1(b), wave receiving box 1 is installed being sunk in the coastal sea. Wave receiving box 1 is a rectangular parallelepiped box-shaped member, and has wave receiving box inlet part 2 that is open toward the sea and receives the push and pull of wave 19 on one side surface. Wave receiving box 1 includes seawater filling chamber 1a as a space filled with seawater from wave receiving box inlet part 2 toward the rear part (that is, the downstream side).

Air compression pipe 3 is connected to the upper part of seawater filling chamber 1a of wave receiving box 1 on the rear side (that is, the end portion on the downstream side). Air compression pipe 3 is a hollow pipe installed upright from wave receiving box inlet part 2 perpendicularly to the downstream direction, for example, in the vertical direction, and is configured to be directed toward the downstream side, that is, from the bottom to the top, and to be connected by air compression pipe lower part 5, air throttle 4, and air compression pipe upper part 6 in this order. Air compression pipe lower part 5 has a wider flow path cross-sectional area than that of air compression pipe upper part 6, and air compression pipe lower part 5 and air compression pipe upper part 6 are connected to each other by air throttle 4 with a tapered conical surface.

Air compression pipe upper part 6 of air compression pipe 3 includes pressure measuring device 7 for measuring the pressure inside air compression pipe upper part 6, and as will be described later, the measurement result can be used as information for determining the negative pressure and the atmospheric pressure.

At the upper end of air compression pipe upper part 6 of air compression pipe 3, air suction pipe 8 that functions as air suction port 8a and air discharge pipe 9 that functions as an air discharge port are provided. First and second check valves 10*a* and 10*b* are provided in the middle of air suction pipe 8 and air discharge pipe 9, respectively, and air flows only in one direction. In other words, air suction pipe 8 flows only in the direction in which the air is suctioned into air compression pipe 3 by first check valve 10*a*, and does not flow in the reverse direction. Air discharge pipe 9 flows only in the direction in which the compressed air is discharged from air compression pipe 3 by second check valve 10*b*, and does not flow in the reverse direction.

Compressed air storage tank 11 is provided at the tip of the flow path of air discharge pipe 9, and is filled with the compressed air compressed by air compression pipe 3.

The compressed air stored in compressed air storage tank 11 is utilized for power generation or the like by compressed air utilizer 14 provided in the downstream flow path of compressed air storage tank 11.

Compressed air storage tank 11 and the upper part of air compression pipe 3 are connected to each other by pressure return pipe 12, and pressure return pipe 12 includes pressure return on-off valve 13 that opens and closes the flow path of pressure return pipe 12 under the control of control device 16.

Water level detecting device 15 for detecting the water level in air compression pipe 3 is installed in air compression pipe lower part 5.

Furthermore, control device 16 for controlling the opening and closing of pressure return on-off valve 13 by the detection signal of water level detecting device 15 is provided.

Figure 2:
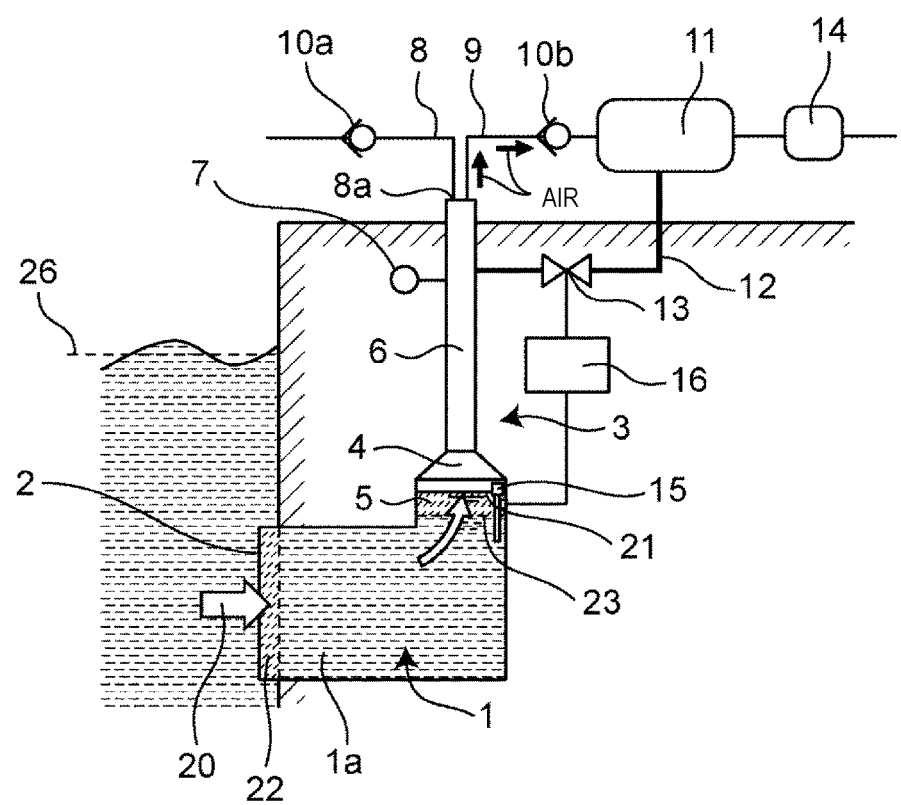
FIG. 2 is a view illustrating an air flow during a leading wave according to Embodiment 1 of the present invention.

FIG. 2 is a view illustrating an air flow during a leading wave in the device configuration according to Embodiment 1 of the present invention. The same components as those in FIG. 1 use the same reference numerals, and the description thereof will be omitted.

In FIG. 2, seawater 22 pushed by wave (underwater) 20 invades wave receiving box 1 from wave receiving box inlet part 2, and water surface 21 in air compression pipe 3 is pushed up from reference water surface 23 by the same volume as that of invaded seawater 22. At this time, the air in air compression pipe 3 is compressed, and by further increasing the force applied per unit area by air throttle 4, the air can be compressed to a higher pressure. The compressed high-pressure air is discharged from air compression pipe 3 through air discharge pipe 9 and is filled in compressed air storage tank 11.

Here, an example of a method of determining reference water surface 23 will be described. When water surface 21 pushed up by the wave passes through air throttle 4, a pressure loss occurs. Therefore, it is desirable that reference water surface 23 is sufficiently below air throttle 4 such that water surface 21 pushed up by the wave does not reach air throttle 4. When reference water surface 23 is set at the same position as the tide level lower limit, an extra force for lifting up the liquid level is required and a loss occurs. Therefore, it is desirable that reference water surface 23 is lower than the tide level lower limit. Taking these into consideration, reference water surface 23 can be determined based on the opening ratio of wave receiving box 1 and air compression pipe lower part 5, the tide level fluctuation of the coast where the device is installed, and the magnitude of the wave.

Figure 3:
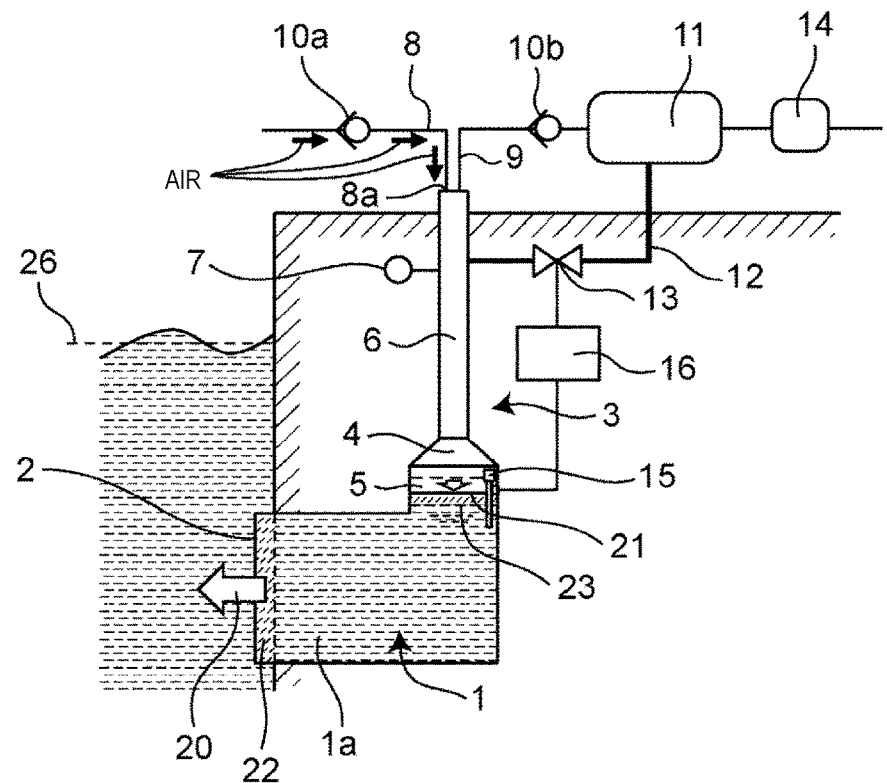
FIG. 3 is a view illustrating an air flow during a backwash according to Embodiment 1 of the present invention.

FIG. 3 is a view illustrating an air flow during a backwash in the device configuration according to Embodiment 1 of the present invention. The same components as those in FIG. 1 use the same reference numerals, and the description thereof will be omitted.

In FIG. 3, seawater 22 drawn by wave (underwater) 20 in the backwash after the leading wave of FIG. 2 comes out of wave receiving box 1 through wave receiving box inlet part 2 and is pulled down by water surface 21 in air compression pipe 3 pushed up by the leading wave. At this time, the air in air compression pipe 3 expands, and air compression pipe upper part 6 suddenly becomes a negative pressure due to the effect of air throttle 4. Air flows into air compression pipe 3 having a negative pressure inside from air suction pipe 8, the inside of air compression pipe 3 becomes atmospheric pressure, and the inflow of air from air suction pipe 8 ends. At this time, since tide level 26 is higher than reference water surface 23, water surface 21 does not return to reference water surface 23, and water surface 21 remains higher than reference water surface 23.

The negative pressure and the atmospheric pressure can be determined by measuring the pressure with pressure measuring device 7.

Figure 4:
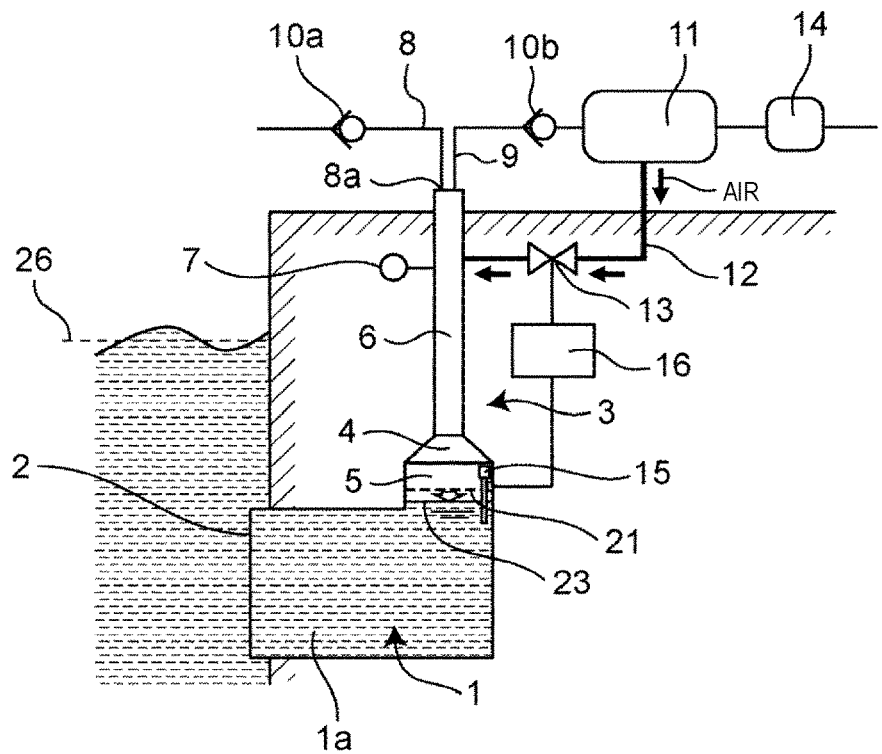
FIG. 4 is a view illustrating an air flow from a pressure return pipe according to Embodiment 1 of the present invention.

FIG. 4 is a view illustrating an air flow from pressure return pipe 12 according to Embodiment 1 of the present invention. The same components as those in FIG. 1 use the same reference numerals, and the description thereof will be omitted.

In FIG. 4, pressure measuring device 7 detects a state where the inflow of air from air suction pipe 8 is eliminated and the inside of air compression pipe 3 becomes atmospheric pressure. At this time, when water level detecting device 15 installed in air compression pipe lower part 5 detects that water surface 21 has not returned to reference water surface 23, pressure return on-off valve 13 is opened via control device 16, the compressed air is supplied from pressure return pipe 12 to air compression pipe 3 to push down water surface 21 until reaching the height of reference water surface 23.

In this manner, the air compression operation by the leading wave of FIG. 2, the air suction operation by the backwash of FIG. 3, and the pressure return control operation for reaching reference water surface 23 of FIG. 4 are repeated, and compressed air storage tank 11 is filled with compressed air.

As described above, according to the wave power utilization device and the control method thereof according to the embodiment of the present invention, the wave receiving box is installed being sunk in the coastal sea, the pressure return on-off valve is opened and closed, a part of the compressed air is returned to the inside of the air compression pipe by the pressure return pipe, and accordingly, the water surface in the air compression pipe is lowered to be lower than the air throttle. By receiving the leading wave in this state, even when there are tide level fluctuations and wave size variations in one wave receiving box, the energy of the wave is converted into compressed air without loss, is stored in the compressed air storage tank, and can be used for power generation or the like by the compressed air utilizer. In other words, the wave power utilization device and the control method thereof can efficiently store and utilize the wave power as compressed air with a simple configuration without being affected by tide level fluctuations and wave size variations.

Specifically, wave receiving box 1 is installed being sunk in the coastal sea, pressure return on-off valve 13 is opened and closed, and a part of the compressed air is returned to the inside of air compression pipe 3 by pressure return pipe 12. Otherwise, control device 16 controls the opening and closing of pressure return on-off valve 13 according to the water level detected by water level detecting device 15, and a part of the compressed air is returned to the inside of air compression pipe 3 via pressure return pipe 12. With this configuration, water surface 21 in air compression pipe 3 can be lowered to be lower than air throttle 4, that is, can be pushed down to reference water surface 23 in air compression pipe lower part 5. By receiving the leading wave in this state, for example, without installing the plurality of wave introduction boxes as described in the related art, even when there are tide level fluctuations and wave size variations in one wave receiving box 1 from tide level upper limit 17 to tide level lower limit 18 of (a) of FIG. 1, the energy of the wave is converted into compressed air without loss, is stored in compressed air storage tank 11, and can be used for power generation or the like by compressed air utilizer 14.

In the embodiment, the inflow of air from air suction pipe 8 is determined by pressure measuring device 7, but the inflow may be determined by installing a flowmeter in either the front or rear flow path of air suction port 8a by using the flow rate of air.

Embodiment 2

Figure 5:
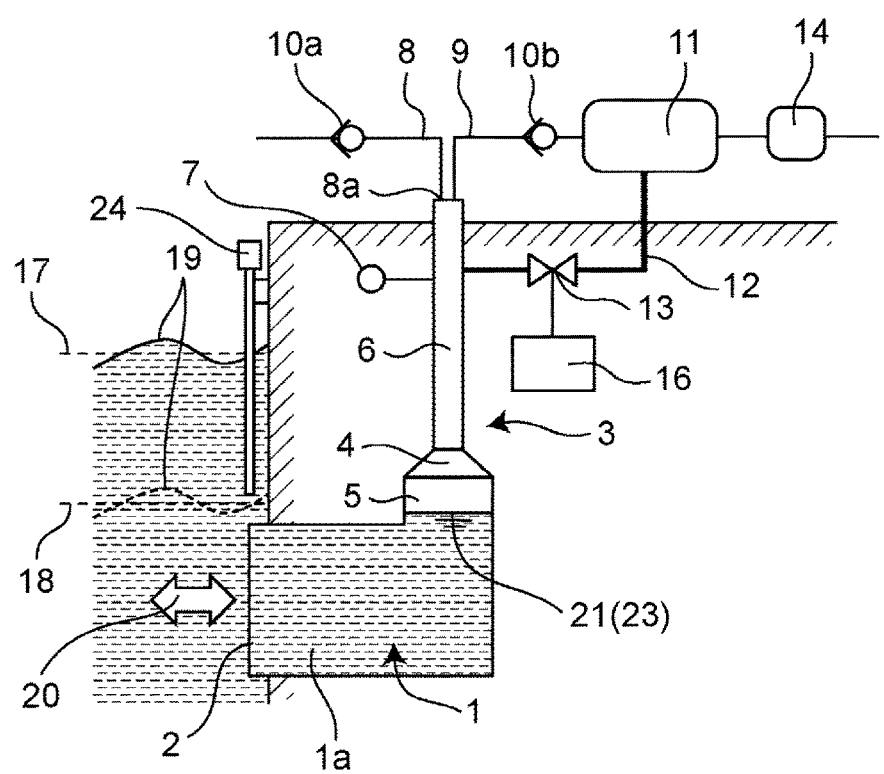
FIG. 5 is an overall view of a wave power utilization device according to Embodiment 2 of the present invention.

FIG. 5 is a view illustrating a configuration of a wave power utilization device according to Embodiment 2 of the present invention. The same components as those in FIG. 1 use the same reference numerals, and the description thereof will be omitted.

Embodiment 2 is different from Embodiment 1 in that wave height measuring device 24 for measuring the height of wave 19 is installed in the coastal area, and in the function of control device 16.

Control device 16 calculates the pressure inside air compression pipe 3 for setting the water level inside air compression pipe 3 to reference water surface 23 based on the wave height measured by wave height measuring device 24, and controls the opening and closing of pressure return on-off valve 13 such that the pressure value measured by pressure measuring device 7 installed in air compression pipe 3 becomes the same as the pressure inside obtained air compression pipe 3.

According to this configuration, the pressure for lowering water surface 21 in air compression pipe 3 to reference water surface 23 is calculated based on the difference between the height of reference water surface 23 and the wave height measured by wave height measuring device 24 by control device 16. Furthermore, control device 16 controls pressure return on-off valve 13 such that the pressure value of pressure measuring device 7 in air compression pipe 3 becomes the calculated pressure value, and accordingly, water surface 21 in air compression pipe 3 is pushed down to reference water surface 23 in air compression pipe lower part 5. By receiving the leading wave in this state, even when there are tide level fluctuations and wave size variations in one wave receiving box 1 from tide level upper limit 17 to tide level lower limit 18, the energy of the wave is converted into compressed air without loss, is stored in compressed air storage tank 11, and can be used for power generation.

Figure 6:
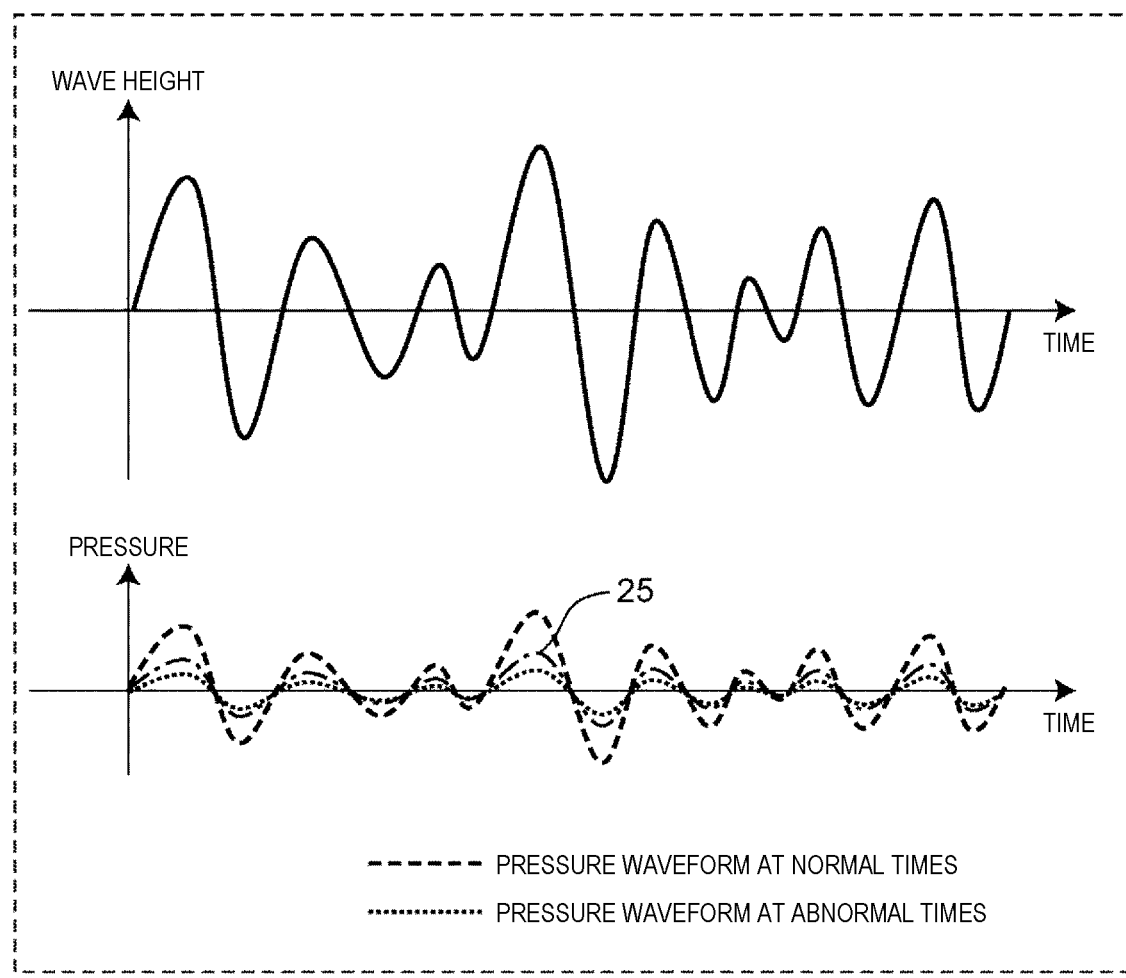
FIG. 6 is a view illustrating a relationship between a wave height and a pressure value of the air compression pipe according to Embodiment 2 of the present invention.
Figure 7:
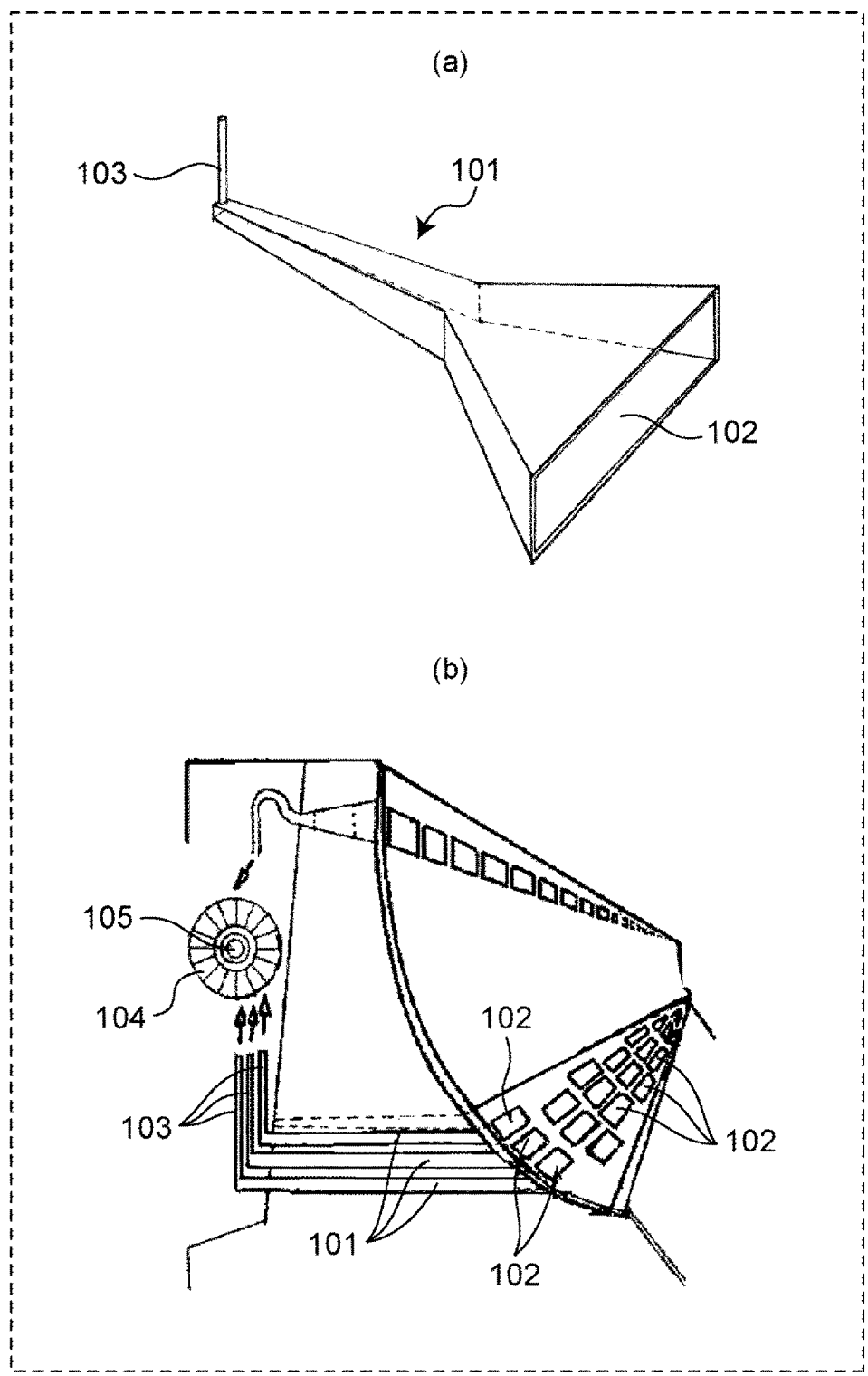
FIG. 7 is a view illustrating a power generation method that utilizes wave power in the related art described in Japanese Patent Unexamined Publication No. 2014-20360.

FIG. 6 is a view illustrating the wave height and the pressure value of air compression pipe 3 according to Embodiment 2 of the present invention.

In FIG. 6, the upper graph illustrates the change in wave height measured by wave height measuring device 24. Meanwhile, in FIG. 6, the lower graph illustrates the change in pressure value measured by pressure measuring device 7 provided in air compression pipe 3 at the same time. Control device 16 sets the set pressure according to the height of the wave. As illustrated in FIG. 6, when the wave height is a positive value, set pressure 25 becomes a positive value. When the wave height is a negative value, set pressure 25 becomes a negative value. When the wave height is a positive value, the pressure of air compression pipe 3 becomes a positive value (during air compression). When the wave height is a negative value, the pressure of air compression pipe 3 becomes a negative value (during air expansion). In a case where the absolute value of the pressure of air compression pipe 3 is lower than the absolute value of set pressure 25, control device 16 determines that air compression pipe 3 is clogged, and control device 16 opens pressure return on-off valve 13, and discharges air from wave receiving box inlet part 2, and accordingly, foreign matter in air compression pipe 3 can be removed.

By injecting high-pressure air of compressed air storage tank 11 from pressure return pipe 12 against clogging of foreign matter and removing foreign matter in air compression pipe 3 to clear the clogging of the pipe, it is possible to improve maintainability and reliability of long-term operation, which are important for the operation in the ocean.

By appropriately combining any of the various embodiments or modification examples among the various embodiments or modification examples, the effects of each can be achieved. It is possible to combine the embodiments with each other or the examples with each other, or the embodiments and the examples with each other, and also to combine the features in the different embodiments or the examples.

The wave power utilization device and the control method thereof according to the aspect of the present invention can efficiently store and utilize the wave power as compressed air with a simple configuration without being affected by tide level fluctuations and wave size variations for power generation or the like, and can be used as clean energy resources.

What is claimed is:

1. A control method of controlling a wave power utilization device including
   a wave receiving box which has a wave receiving box inlet part that is open toward the sea and receives rushing of a wave, has a space filled with seawater from the wave receiving box inlet part toward a downstream side, and is sunk on the coast,
   a hollow air compression pipe in which a lower pipe is set to have a wider flow path cross-sectional area than that of an upper pipe, an air throttle that connects the lower pipe and the upper pipe to each other in a tapered shape is provided, the lower pipe is connected upright to an upper part on the downstream side of the wave receiving box, and air is compressed to form compressed air,
   a pressure measuring device which measures a pressure of the air compression pipe,
   an air suction port connected to an upper end of the air compression pipe and provided with a first check valve to suction the air from an outside of the air compression pipe,
   an air discharge pipe connected to the upper end of the air compression pipe and provided with a second check valve to discharge the compressed air from an inside of the air compression pipe,
   a compressed air storage tank installed downstream of the air discharge pipe and filled with the compressed air discharged from the air compression pipe,
   a pressure return pipe connecting the compressed air storage tank and the air compression pipe to each other,
   a pressure return on-off valve which is provided in the middle of the pressure return pipe and opens and closes a flow path of the pressure return pipe, and a compressed air utilizer which is provided in a flow path on a downstream side of the compressed air storage tank and utilizes the compressed air, the method comprising:

suctioning the air into the air compression pipe from the air suction port during a backwash;

opening the pressure return on-off valve after confirming suction of the air with the pressure measuring device;

returning a part of the compressed air filled in the compressed air storage tank to the inside of the air compression pipe through the pressure return pipe; and lowering a water surface in the air compression pipe to be lower than the air throttle.

2. The control method of a wave power utilization device of claim 1, wherein a water level detecting device for detecting a water level in the air compression pipe is installed in the air compression pipe, and the opening and closing of the pressure return on-off valve is controlled by the water level in the air compression pipe detected by the water level detecting device.

3. The control method of a wave power utilization device of claim 1, wherein a wave height measuring device for measuring a wave height is installed, a pressure inside the air compression pipe for lowering the water level in the air compression pipe to be lower than the air throttle is calculated based on a wave height measured by the wave height measuring device, and the pressure return on-off valve is open until the pressure measuring device installed in the air compression pipe reaches the pressure inside the air compression pipe.

4. The control method for a wave power utilization device of claim 1, wherein a wave height measuring device for measuring a wave height is installed, and the pressure return on-off valve is opened and the air is discharged from the wave receiving box inlet part in a case where an absolute value of a pressure value at the time of air compression measured by the pressure measuring device in the air compression pipe is lower than a pressure value set according to the wave height measured by the wave height measuring device.

5. A wave power utilization device comprising:

a wave receiving box which has a wave receiving box inlet part that is open toward the sea and receives rushing of a wave, has a space filled with seawater from the wave receiving box inlet part toward a downstream side, and is sunk on the coast;

a hollow air compression pipe in which a lower pipe is set to have a wider flow path cross-sectional area than that of an upper pipe, an air throttle that connects the lower pipe and the upper pipe to each other in a tapered shape is provided, the lower pipe is connected upright to an upper part on the downstream side of the wave receiving box, and air is compressed to form compressed air;

a pressure measuring device which measures a pressure of the air compression pipe;

an air suction port connected to an upper end of the air compression pipe and provided with a first check valve to suction the air from an outside of the air compression pipe;

an air discharge pipe connected to the upper end of the air compression pipe and provided with a second check valve to discharge the compressed air from an inside of the air compression pipe;

a compressed air storage tank installed downstream of the air discharge pipe and filled with the compressed air discharged from the air compression pipe;

a pressure return pipe connecting the compressed air storage tank and the air compression pipe to each other;

a pressure return on-off valve which is provided in the middle of the pressure return pipe and opens and closes a flow path of the pressure return pipe;

a compressed air utilizer which is provided in a flow path on a downstream side of the compressed air storage tank and utilizes the compressed air;

a water level detecting device which is installed in the air compression pipe and detects a water level in the air compression pipe; and a control device that controls the pressure return on-off valve based on the water level in the air compression pipe detected by the water level detecting device.

6. A wave power utilization device comprising:

a wave receiving box which has a wave receiving box inlet part that is open toward the sea and receives rushing of a wave, has a space filled with seawater from the wave receiving box inlet part toward a downstream side, and is sunk on the coast;

a hollow air compression pipe in which a lower pipe is set to have a wider flow path cross-sectional area than that of an upper pipe, an air throttle that connects the lower pipe and the upper pipe to each other in a tapered shape is provided, the lower pipe is connected upright to an upper part on the downstream side of the wave receiving box, and air is compressed to form compressed air;

a pressure measuring device which measures a pressure of the air compression pipe;

an air suction port connected to an upper end of the air compression pipe and provided with a first check valve to suction the air from an outside of the air compression pipe;

an air discharge pipe connected to the upper end of the air compression pipe and provided with a second check valve to discharge the compressed air from an inside of the air compression pipe;

a compressed air storage tank installed downstream of the air discharge pipe and filled with the compressed air discharged from the air compression pipe;

a pressure return pipe connecting the compressed air storage tank and the air compression pipe to each other;

a pressure return on-off valve which is provided in the middle of the pressure return pipe and opens and closes a flow path of the pressure return pipe;

a compressed air utilizer which is provided in a flow path on a downstream side of the compressed air storage tank and utilizes the compressed air;

a wave height measuring device for measuring a wave height; and a control device that calculates a pressure inside the air compression pipe for lowering a water level in the air compression pipe based on the wave height measured by the wave height measuring device to be lower than the air throttle, and controls the pressure return on-off valve such that a pressure value measured by the pressure measuring device installed in the air compression pipe becomes the same as the pressure inside the air compression pipe.

* * * * *